United States Patent [19]
Ochiai

[11] Patent Number: 4,785,902
[45] Date of Patent: Nov. 22, 1988

[54] SUCTION TYPE TRAVELING CARRIAGE

[75] Inventor: Nobutoshi Ochiai, Kashiwa, Japan

[73] Assignee: Ishikawajima Kensa Keisoku Kabushiki Kaisha, Tokyo, Japan

[21] Appl. No.: 107,567

[22] Filed: Oct. 9, 1987

[30] Foreign Application Priority Data

Feb. 6, 1987 [JP] Japan .................................. 62-25664

[51] Int. Cl.⁴ .............................................. B62D 57/02
[52] U.S. Cl. .................................... 180/164; 180/8.1; 180/8.7; 180/901; 446/177

[58] Field of Search ................... 180/164, 8.1, 8.7, 7.1, 180/901; 446/177; 114/222

[56] References Cited

U.S. PATENT DOCUMENTS 3,251,430  5/1966  Veryzer ............................. 180/7.1
3,268,023  8/1966  DeNapoli ........................... 180/164

Primary Examiner—John A. Pekar

[57] ABSTRACT

A suction type traveling carriage which can be maintained in very intimate contact relationship with a wall, a ceiling or the like and can be moved in a stable manner by rotation of suction cups.

13 Claims, 4 Drawing Sheets

SUCTION TYPE TRAVELING CARRIAGE

BACKGROUND OF THE INVENTION

The present invention relates to a suction type traveling carriage capable of traveling over walls and ceilings.

Well-known in the art is a carriage with magnetic wheels which is attracted to walls and ceilings by magnetic forces of the magnetic wheels and travels thereover. Apparently, such carriage with magnetic wheels can be used only when the walls and ceilings are made of magnetic materials. Therefore, there has been a strong demand for traveling carriages capable of traveling over walls and ceilings even when the latter are not made of magnetic materials.

To overcome the above problem, there has been devised and demonstrated a traveling carriage with a plurality of movable arms each having at its end a suction cup adapted to be attracted to walls and ceilings when it is evacuated and adapted to be released therefrom when its internal pressure is restored to a normal level. With such suction type traveling carriages, first all the suction cups are evacuated for attraction of the carriage to the wall or ceiling. Next the suction cups are grouped into a suitable number of groups and while internal pressures of the suction cups in one group are restored to a normal level, they are displaced in a direction of travel. After the displacement, they are evacuated again and are maintained at the positions. Then, the suction cups of another group are actuated in like manner and the arms are retracted to drag the carriage in the direction of travel. These steps are sequentially repeated so that the suction cups are displaced in a walking manner and consequently the carriage is moved over the wall or ceiling while being attracted thereto.

There has been devised and demonstrated another vacuum type traveling carriage in which the carriage itself is in the form of a vacuum chamber adapted to be selectively evacuated or restored to a normal level and in which wheels are disposed. While the carriage itself is attracted to a wall or ceiling, the wheels within the carriage are driven to move the carriage over the wall or ceiling.

However, the suction type traveling carriages of the type described above have extreme difficulty in increasing its velocity because the displacements are intermittent and need very complex valve-switching operations. While the suction cups in one group are released from the vacuum and are advanced forwardly, the remaining groups of suction cups are evacuated for attraction of the carriage to the wall or ceiling so that the carriage must be equipped with a number of suction cups which is almost twice as many as minimum number of suction cups required for attaining secure contact of the carriage with the wall or ceiling. Furthermore the same number of means for walking of the carriage is required. As a result, the carriage becomes complex in construction, heavy in weight, large in size and very expensive. Moreover in order to make the carriage turnable, its construction becomes further complicated.

In the case of the carriage in the form of a vacuum chamber having driving wheels therein, the carriage encouters a considerably high degree of resistance when it travels over a wall or ceiling. As a result, it becomes extremely difficult to simultaneously accomplish attraction of the carriage to the wall or ceiling as well as traveing thereof so that the carriage capable of these simultaneous operations will become complicated in construction.

In view of the above, a primary object of the present invention is to provide a suction type traveling carriage which is simple in construction yet capable of ensuring secure attraction of the carriage to a wall or ceiling while incresing the velocity of the carriage.

The above and other objects, effects, features and advantages of the present invention will become more apparent from the following description of some embodiments thereof taken in conjuction with the accompanying drawings.

DETAILED DESCRIPTION OF THE PREFERRED EMBODIMENTS

Figure 1:
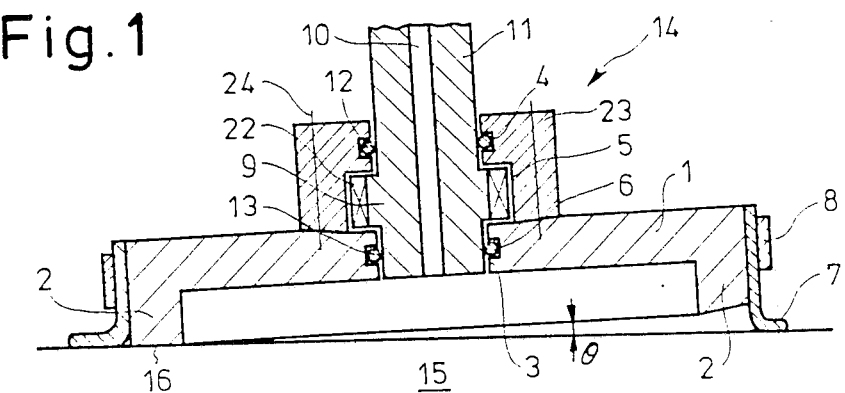
FIG. 1 is a sectional view used to explain a preferred embodiment of the present invention.

FIG. 1 is a view used to explain a preferred embodiment of suction cup means in accordance with the present invention.

A rigid, disc-shaped suction-cup main body 1 has a downward, circumferential projection 2 extending from the whole periphery of one surface of the main body 1 in coaxial and integral relationship therewith so that a desired disc-shaped space is defined by the main body 1 and the projection 2. Alternatively, the projection 2 may be separately fabricated from material different from that of the rigid main body 1. An axially entending throuth hole 3 is formed at the center of the main body 1 and an annular groove 6 is formed on the cylindrical inner wall surface of the main body 1 defining the through hole 3.

A flexible cylindrical body 7 is fitted over the projection 2 extending downwardly from the outher periphery of the main body 1 such that the lower end of the cylindrical body 7 extends beyond the lower end of the projection 2. A hoop or band 8 is hooped around the cylindrical body 7 to secure the latter to the main body 1.

A shaft 11 having a flanged projection 9 with a bearing 22 and having a bore 10 is rotatably fitted into the through hole 3 of the main body 1 on the side opposite to the projection 2 by a cylindrical 1 shaft-retaining member 23 which has vertically spaced small and large annular grooves 4 and 5 on its inner wall surface. In this case, 0 rings 12 and 13 are previously fitted into the annular grooves 4 and 6, respectively, but it is to be understood that only the 0 ring 12 or 13 may be fitted into the annular grooves 4 or 6. The upper or rear end of the shaft 11 is communicated with a vacuum source (not shown).

The shaft 11 is so inclined that the suction cup means 14 with above-described construction makes a very small angle 0 with respect to a wall or ceiling 15 such that only a portion of the circular end of the projection 2 is made into contact with the wall or ceiling 15. When the projection 2 is made of rigid material and integral with the main body 1, the circular end of the projection 2 is tapered at an angle $\theta$ so that a contact portion 16 thereof is made into intimate contact with the wall or ceiling 15. When the projection 2 is made of flexible material such as rubber, plastic or the like, it is not necessarily needed to taper the lower circular end of the projection 2. In the latter case, the lower end of the flexible cylindrical member 7 extending beyond the projection 2 is forced to bend in the radially outwardly direction so that the whole circular lower end of the projection 2 is made into intimate contact with the wall or ceiling 15.

When air in the space defined by the main body 1 and the projection 2 is evacuated through the bore 10 in communication with the vacuum source (not shown), the flexible cylindrical body 7 is force into intimate contact with the wall or ceiling 15 to seal the above-described space in vacuum state. As a result, the suction cup means 14 is securely attached to the wall or ceiling 15. In this case, the shaft 11 is maintained to be inclined at an angle $\theta$.

The suction cup means 14 receives as an eccentric load a reaction force from the wall or ceiling 15 at one point of the contact portion 16 so that, when a force is exerted through the shaft 11 to the suction cup means 14 in the direction in parallel with the wall or ceiling 15, the suction cup means 14 easily rotates about the shaft 11 while keeping in intimate contact with the wall or ceiling 15, whereby the suction cup means 14 continuously advanees in the direction of the applied force. Because of the 0 rings 12 and 13 interposed, the sealing ability is not adversely affected even when the main body 1 rotates about the shaft 11 so that the suction cup means 14 is maintained in very intimate contact with the wall or ceiling 15.

Figure 2:
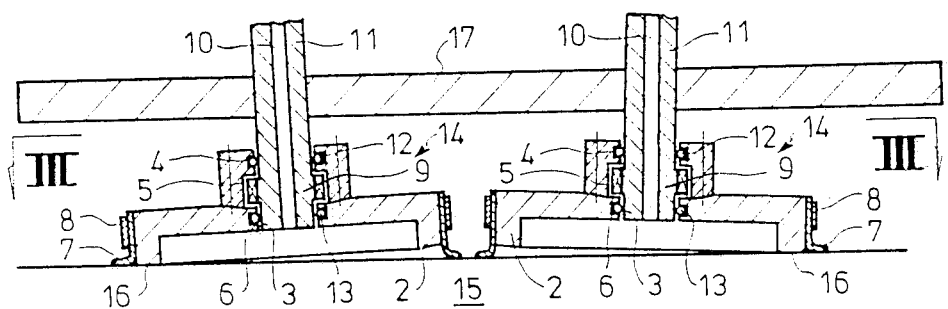
FIG. 2 is a sectional view used to explain a carriage equipped with suction cups of the type shown in FIG. 1.
Figure 3:
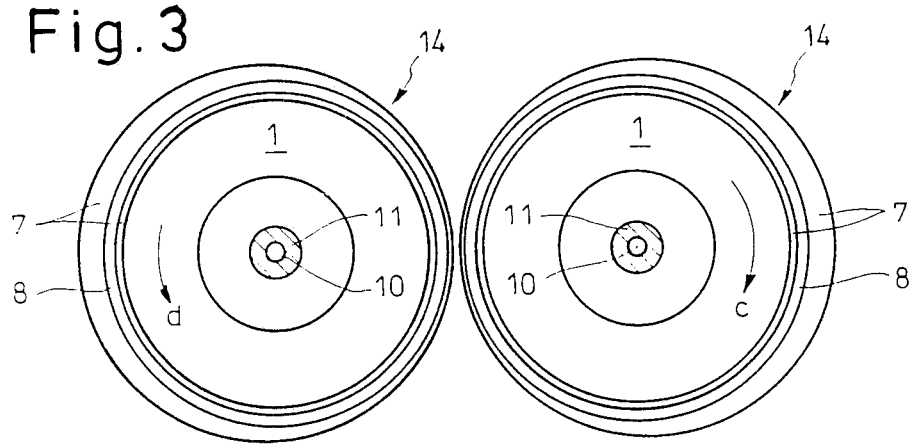
FIG. 3 is a sectional view thereof looking in the direction indicated by the arrows III of FIG. 2.
Figure 4:
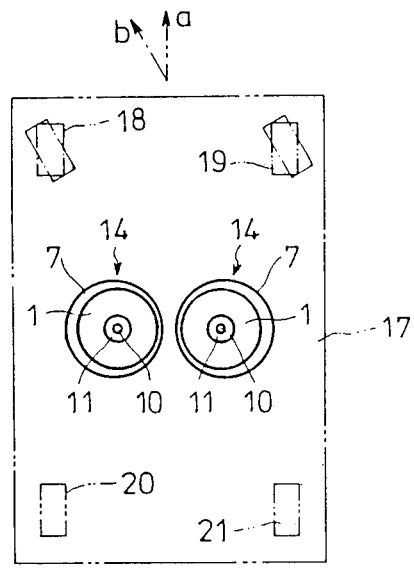
FIG. 4 is plan view of the carriage shown in FIG. 2.

FIG. 2-4 are views used to explain a carriage equipped with the suction cup means 14 of the type just described above with reference to FIG. 1.

Two suction cup means 14 are mounted on the carriage body 17 such that the shafts 11 are inclined downwardly toward each other and therefore the contact portions 16 of the two suction cup means 14 are diametrically spaced apart from each other as long as possible and that the shafts 11 are disposed in the widthwise direction of the carriage body 17.

The carriage body 17 has, for instance, four wheels 18, 19, 20 and 21 at its respective corner and the wheels 20 and 21 shown at a lower portion in FIG. 4 are used as driving wheels while the wheels 18 and 19 shown wheels.

When the carriage body 17 is disposed over the wall or ceiling 15 and the suction cup means 14 are actuated, the latter maintain the carriage body 17 in very intimate relationship with the wall or ceiling 15 because of the suction forces of the suction cup means 14. In the case of moving the carriage over the wall or ceiling 15 in the direction indicated by an arrow a in FIG. 4, the steering wheels 18 and 19 are directed in the direction a while the driving wheels 20 and 21 are driven. Then the right and left suction cup means 14 maintain the very close contact between the carriage body 17 and the wall or ceiling 15 and move with the carriage body in the direction a while they rotate at the same velocity in the opposite directions. In the case of turning the moving direction of the carriage body 17 attracted to the wall or ceiling 15, for instance, in the direction indicated by an arrow b in FIG. 4, the steering wheels 18 and 19 are steered in the direction b and the driving wheels 20 and 21 are driven. Then the rotational speeds of the suction cup means 14 vary as indicated by the arrows c and d in FIG. 3 from each other so that they individually follow the steering direction of the carriage body 17.

Figure 5:
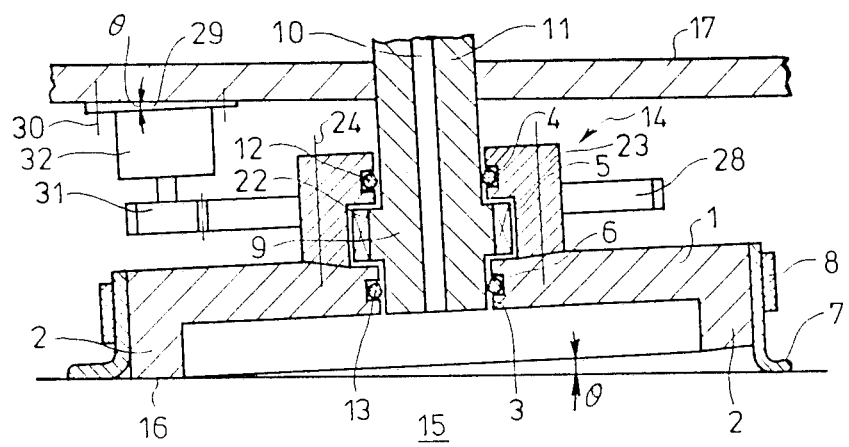
FIG. 5 is a sectional view used to explain another preferred embodiment of the present invention.

Next referring to FIG. 5, another preferred embodiment will be described. Same reference numerals are used to designate similar parts in both FIGS. 1 and 5.

The shaft 11 is securely mounted on the carriage body such that it is maintained in an inclined state as descibed above. A gear 28 is fitted over the outer cylindrical surface of the shaft-retaining memeber 23. An inclined plate 29 inclined at an angle $\theta$ is securely joined by bolts 30 to the surface of the carriage body 17 facing the suction-cup main body 1 in parallel with the gear 28. A motor 32 is securely mounted on the inclined plate 29 and has a driving shaft carrying a gear 31 in mesh with the gear 28.

When the air in the space defined by the main body 1 and the projection 2 is evacuated through the bore 10 in communication with a vacuum source (not shown), the suction cup means 14 is movably attracted to the wall or ceiling 15 in a manner substantially similar to that described above with reference to FIG. 1.

When the motor 32 is energized, the driving force of the motor 32 is transmitted through the intermeshed gears 31 and 28 to the main body 1 to rotate the same so that while maintaining the very intimate contact of the suction cup means 14 with the wall or ceiling 15, the suction cup means 14 advances in the tangetial direction at the contact portion 16, whereby the carriage body 17 travels.

When the contact portion 16 of the projection 2 is worn out, the projecton 2 can be removed together with the main body 1 from the suction cup means 14 by loosening the bolts 24 and is easily replaced with new ones. When the flexible cylindrical body 7 is damaged, it can be detached from the projection 2 by releasing the hoop 8 and is readily replaced with a new one.

Figure 6:
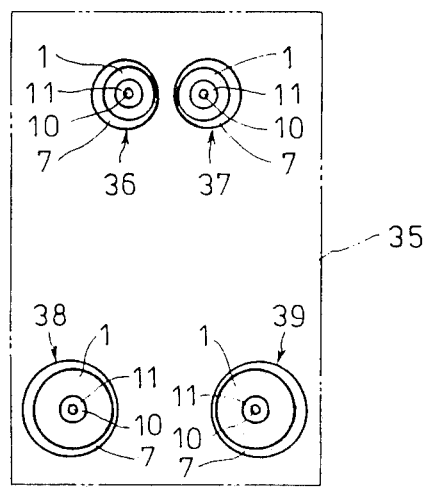
FIG. 6 is a view used to explain the mounting of suction cup means shown in FIG. 5 on a carriage.

Next referring to FIG. 6, a carriage body 35 is equipped with suction cup means 36, 37, 38 and 39 of the type just described above with reference to FIG. 5.

The two suction cup means 36 and 37 are mounted in juxtaposed relationship at the upper portion of the carriage 35 in FIG. 6 while the two suction cup means 38 and 39 are mounted at the lower portion of the carriage 35 adjacent to its lower corners, respectively.

When the motors of the upper suction cups means 36 and 37 are rotated such that the suction cup means 36 and 37 are rotated at same rotational velocity but in opposite directions, the carriage body 35 is moved straightly; but when the rotational velocities of the suction cup means 36 and 37 are made different from each other, the carriage body 35 is turned in the direction of the suction cup means 36 or 37 whose rotational velocity is slower than the other. Thus the two suction cup means 36 and 37 act as steering wheels. The lower suction cup means 38 and 39 are rotated at same rotational velocity and in opposite directions by a common motor or respective motors so that the suction cup means 38 and 39 act as driving wheels. Thus the plurality of suction cup means 36, 37, 38 and 39 are mounted on the carriage body 35 so as to serve respectively as a steering wheel group and a driving wheel group, so that the carriage body 35 can be moved straightly, rotates and turn to any desired direction.

Figure 7:
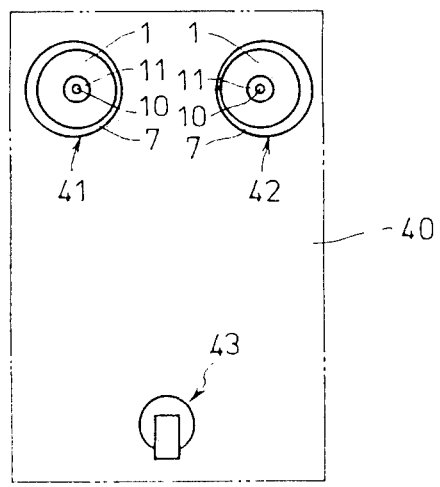
FIG. 7 is a view used to explain another carriage equipped with the suction cup means of the type shown in FIG. 5.

Referring next to FIG. 7, another carriage body 40 upon which the suction cup means 41 and 42 of the type described above with reference to FIG. 5 and a caster 43 are mounted 2 will be described. In this embodiment, the two suction cup means 41 and 42 are energized independently of each other. Therefore, when the two suction cup means 41 and 42 are rotated at same rotational velocity but in opposite directions, the carriage body 40 moves straight; but when their rotational velocities are different and they are rotated in opposite directions, the carriage body 40 is rotated or turned to the direction of cup means 41 or 42 whose rotational velocity is slower than the other. Thus the suction cup means 41 and 42 has a double role as steering and driving wheels.

Figure 8:
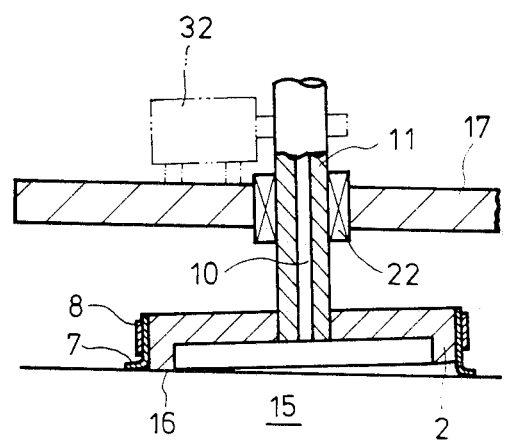
FIG. 8 is a view used to explain a modification in which the shaft is rotatably supported by the carriage and the main body is securely joined to the shaft.

It is to be understood that the present invention is not limited to the above-described embodiments and that various modifications and variations may be effected without leaving the true spirit of the present invention. For instance, the projection is not needed to be fabricated from rigid material and integral with the main body. That is, the projection may be made of material such as rubber, plastic or the like different from that of the main body and may be joined thereto as a component part of the main body. In other words, it suffices that the projection can withstand the reaction force exerted from the wall or ceiling. Furthermore, the shaft of the suction cup means may be secured to the suction-cup main body and rotatably supported by the carriage body as shown in FIG. 8 such that the suction-cup main body can rotate in unison with the shaft. In addition, any flexible material which can ensure the sealing between the suction cup means and the wall or ceiling may be used and may be in any suitable shape such as a funnel. Moreover the fexible cylindrical body may be made of any suitable composite material and may be joined or attached to the projection not by a hoop, but by bonding, embedding, screws or any other suitable combinations thereof. The number and positions of the suction cup means mounted on the carriage body may be suitably selected. For example, the combination of the suction cup means incapable of moving by themselves and the suciton cup means capable of driving, the combination further including the wheels and so on may be freely selected according to a purpose.

As described above, the suction type traveling carriage in accordance with the present invention can maintain a very intimate contact with the wall or ceiling and can move continuously in parallel therewith. Therefore it becomes possible to increase the traveling velocity of the carriage body and turn the carriage body in any direction in a simple manner. In addition, according to the present invention, it suffices to mount a least number of suction cup means sufficient to maintain the intimate contact of the carriage with the wall or ceiling. Furthermore the carriage can be made simple in construction, compact in size, light in weight and inexpensive in cost.

What is claimed is:

1. A suction type traveling carriage comprising suction cup means including a disc-shaped, rigid suction-cup main body having a circumferential projection axially extending from a whole outer periphery of one major surface of said suction-cup main body, a flexible member fitted over said suction-cup main body such that a leading end of said flexible member extends beyond said circumferential projection, and a shaft inclined at a predetermined angle by which said suction-cup main body is rotatably supported such that a portion of said circumferential projection contacts a wall or ceiling and a whole leading end of said flexible member intimately contacts said wall or ceiling,
   a carriage body disposed in parallel with said wall or ceiling,
   said shaft being securely joined to said carriage body, and said suction-cup main body being rotatably supported by said shaft through bearing means, and
   a vacuum source communicated to a space defined by said suction-cup main body and said circumferential projection.

2. A carriage according to claim 1 wherein said circumferential projection is made of same material as that of said suction-cup main body.

3. A carriage according to claim 1 wherein said circumferential projection is made of material different from that of said suction-cup main body.

4. A carriage according to claim 1 wherein said flexible member is detachably fitted over said suction-cup main body.

5. A carriage according to claim 4 wherein said flexible member is fitted over and clamped to said suction-cup main body by a hoop or band.

6. A carriage according to claim 1 wherein said space defined by said suction-cup main body and said circumferential projection is communicated with said vacuum source through a bore of said shaft.

7. A carriage according to claim 1 wherein drive means for rotating said suction-cup main body is mounted on said carriage body.

8. A carriage accordint to claim 1 wherein said carriage body is equipped with a pair of said suction cup means such that their shafts are inclined toward each other on the side adjacent to their main bodies.

9. A carriage according to claim 1 wherein said carriage body is equipped with wheel means for supporting said carriage body in parallel with said wall, or ceiling.

10. A carriage according to claim 1 wherein said carrige body is supported in parallel with said side wall or ceiling only by said suction cup means.

11. A carriage according to claim 1 wherein said carriage body is supported in parallel with said wall or ceiling by said suction cup means as well as wheel means.

12. A suction type traveling carriage comprising suction cup means including a disc-shaped, rigid suction-cup main body having a circumferential projection axially extending from a whole outer periphery of one major surface of said suction-cup main body, a flexible member fitted over said suction-cup main body such that a leading end of said flexible member extends beyond said circumferential projection, and a shaft inclined at a predetermined angle by which said suction-cup main body is rotatably supported such that a portion of said circumferential projection contacts a wall or ceiling and a whole leading end of said flexible member intimately contacts said wall or ceiling,
   a carriage body disposed in parallel with said wall or ceiling,
   said shaft being rotatably supported by said carriage body, and said suction-cup main body being securely joined to said shaft, and
   a vacuum source communicated to a space defined by said suction-cup main body and said circumferential projection.

13. A carriage according to claim 12 wherein drive means for rotating said shaft and suction-cup main body is mounted on said carriage body.

* * * * *